Figure 1:
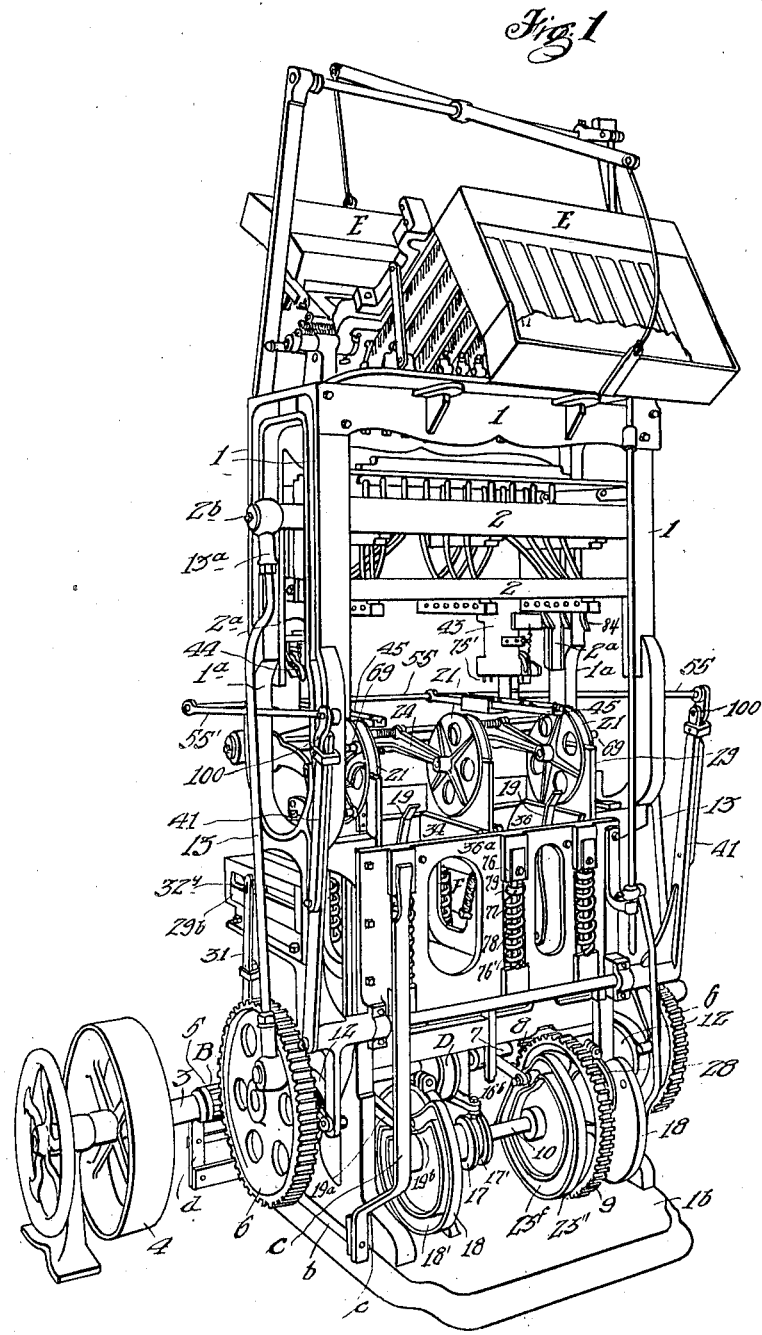

G. D. PARKER.
BOX MAKING MACHINE.
APPLICATION FILED JAN. 4, 1909.

982,439.

Patented Jan. 24, 1911.
5 SHEETS—SHEET 1.

Witnesses:

Inventor,
George D. Parker,
by Raymond Ives Suberlee,
his Attorney.

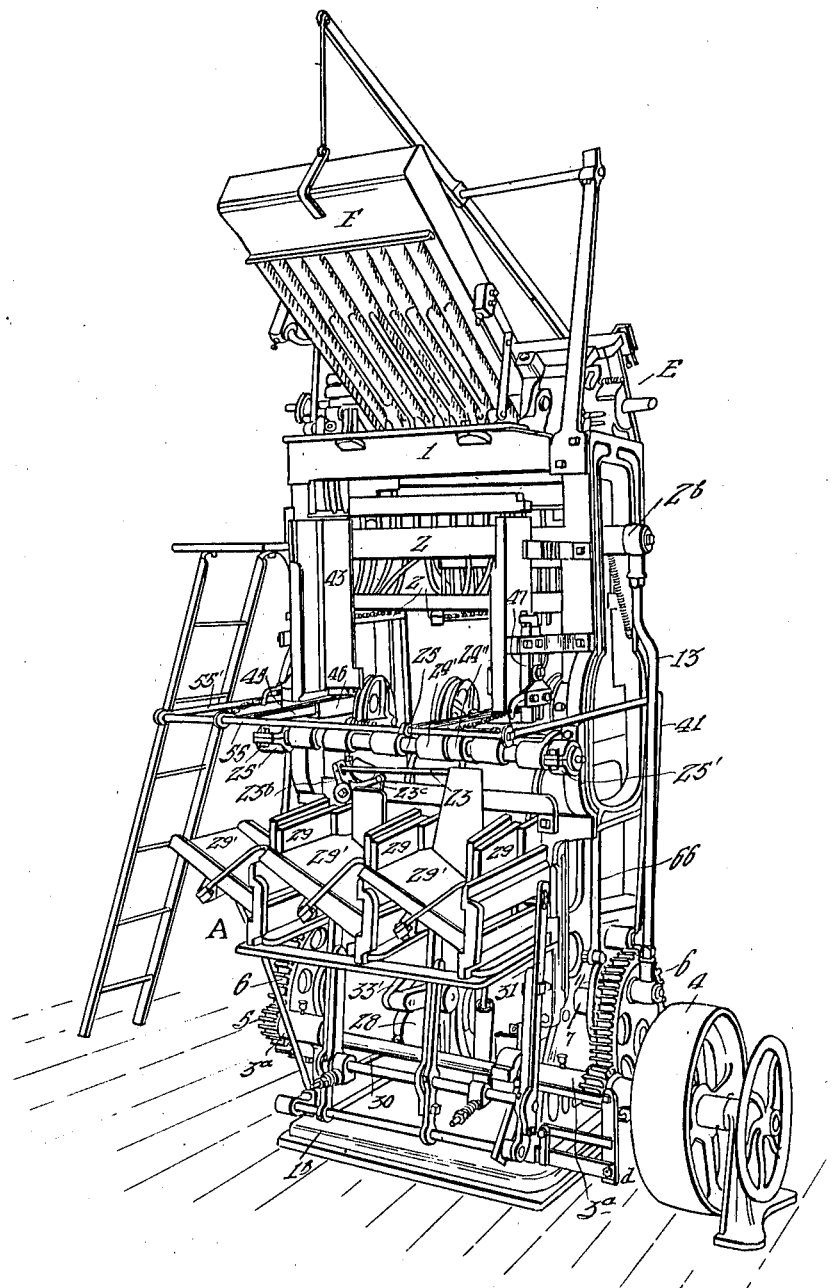

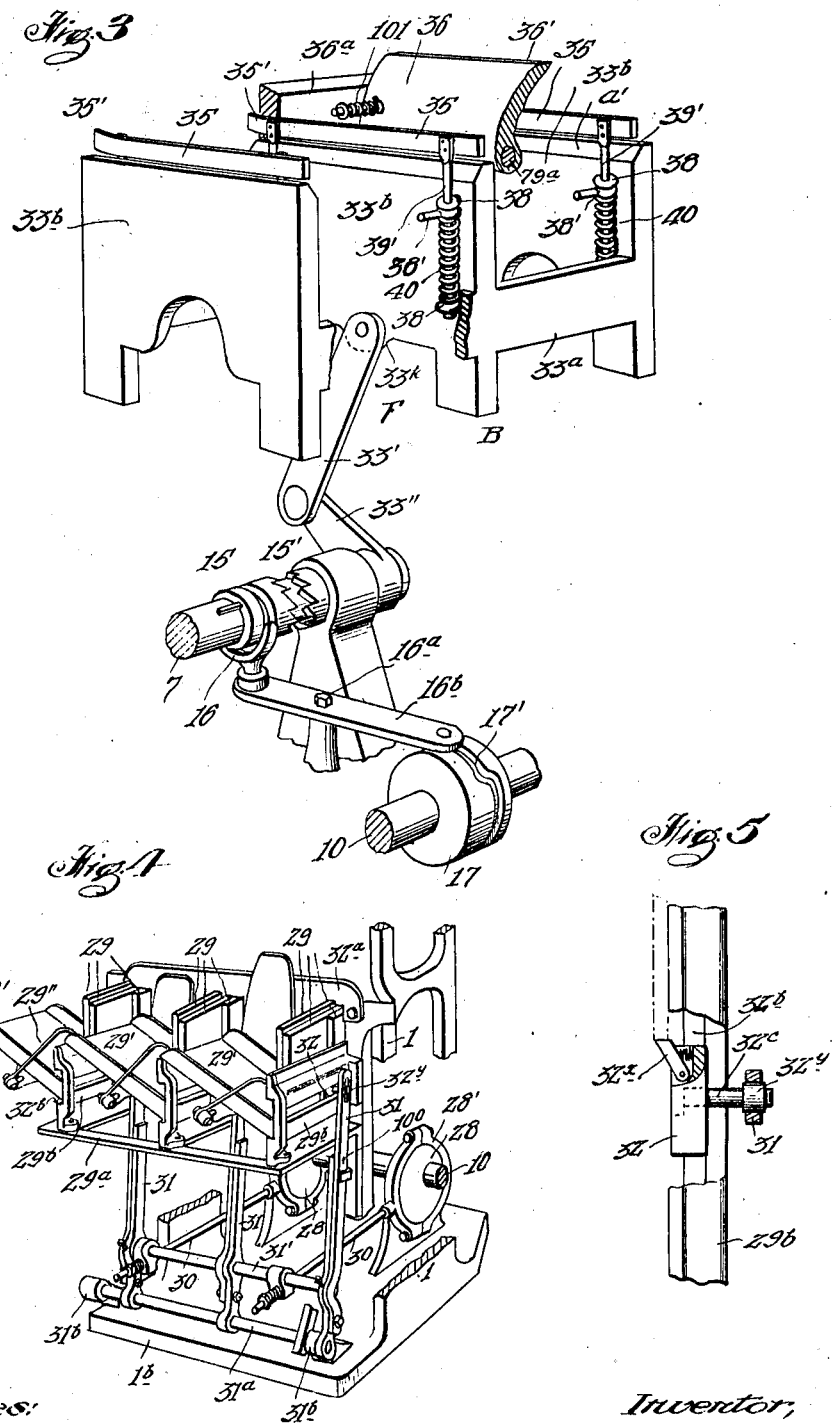

G. D. PARKER.
BOX MAKING MACHINE.
APPLICATION FILED JAN. 4, 1909.
982,439.
Patented Jan. 24, 1911.
5 SHEETS—SHEET 4.
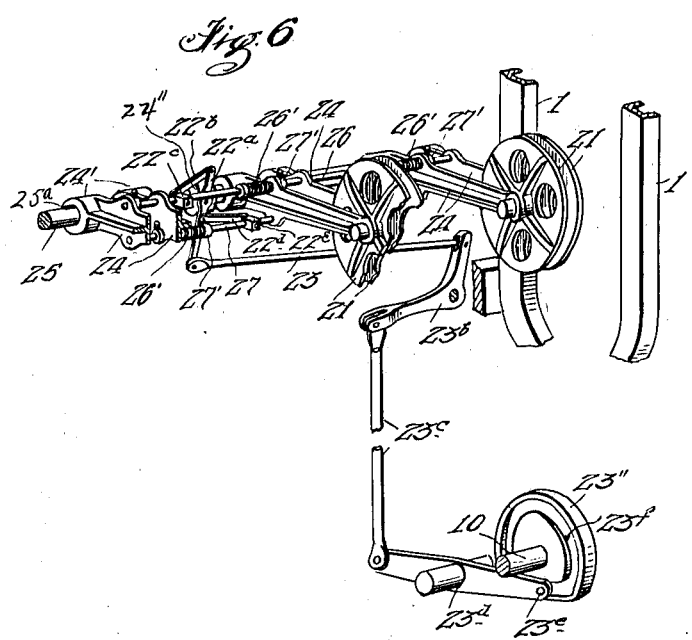
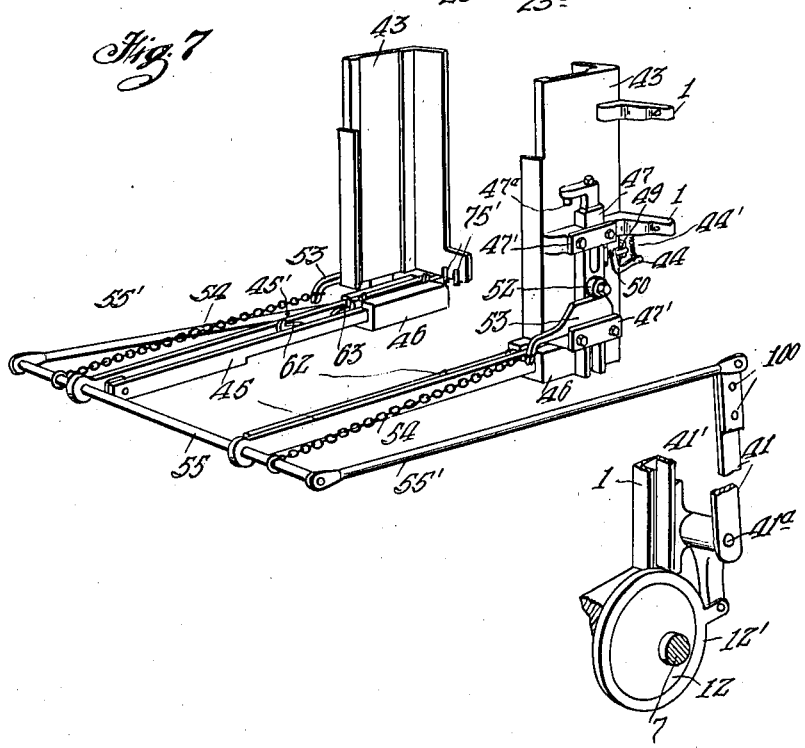
Witnesses:
J. Mansfield
J. E. Adam.
Inventor,
by George D. Parker,
Reynard Blakeslee
his Attorney.

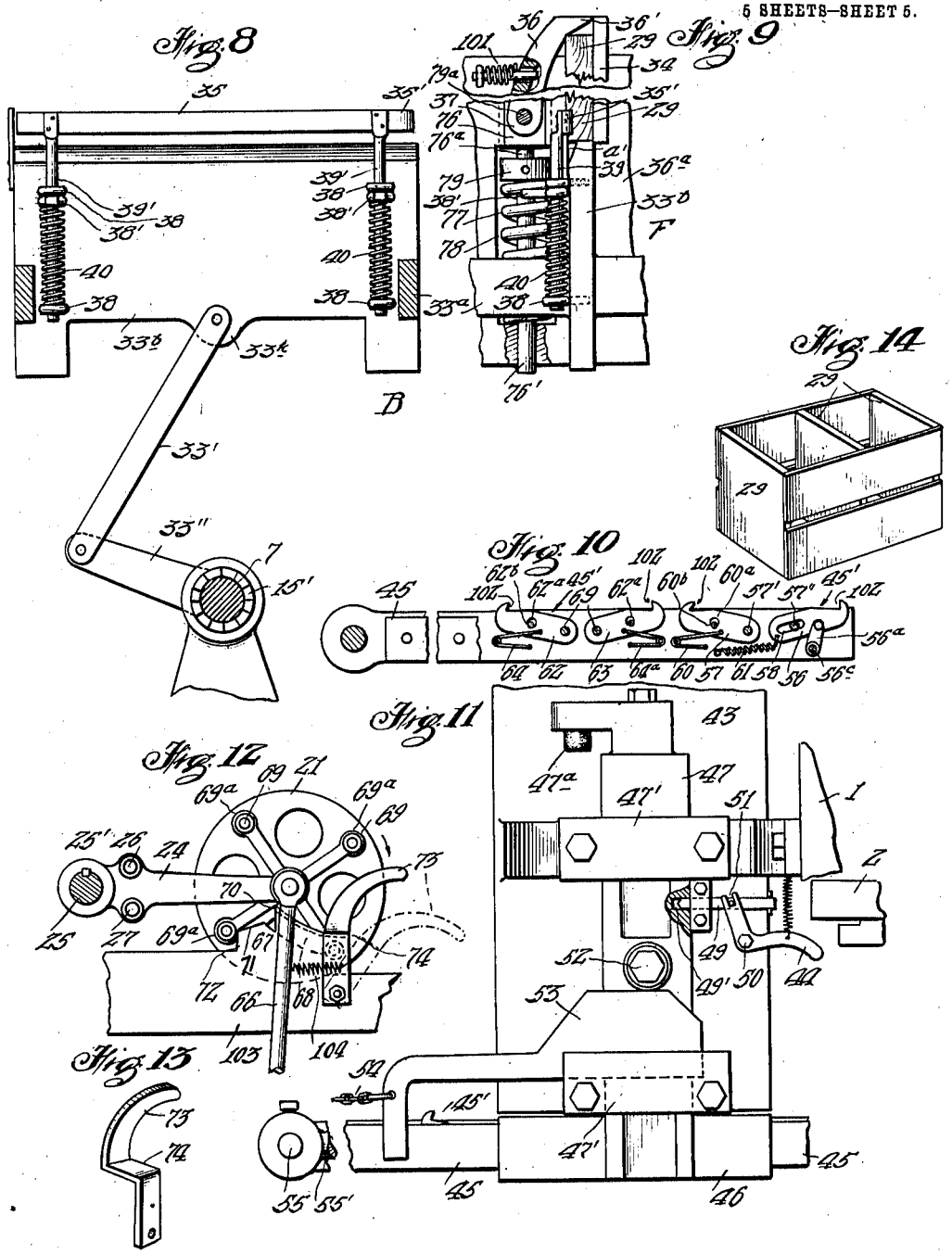

UNITED STATES PATENT OFFICE.

GEORGE D. PARKER, OF RIVERSIDE, CALIFORNIA.

BOX-MAKING MACHINE.

982,439.

Specification of Letters Patent. Patented Jan. 24, 1911.

Application filed January 4, 1909. Serial No. 470,710.

*To all whom it may concern:*

Be it known that I, GEORGE D. PARKER, a citizen of the United States, residing at Riverside, in the county of Riverside and State of California, have invented new and useful Improvements in Box-Making Machines, of which the following is a specification.

This invention relates to machines for making boxes; and it has for its object to provide an improved machine or mechanism for the purpose stated which will be superior in point of durability of construction, positiveness of action, speed of operation, superiority of product or output, and general efficiency and serviceability.

In carrying out the invention, I provide a machine or mechanism automatic in operation and the various members or parts of which operate in continuous sequence, rapidly producing and completing boxes during the continuation of the feed of shooks or stock.

A particular object of the invention consists in the provision of a machine for the purposes specified and particularly adapted for the manufacture of boxes, such as used in the storing and shipping of oranges.

The different parts or elements of the box products are initially supplied from chutes or hoppers; and the end pieces and partition piece for each box are fed edgewise into the machine and suitably clamped and held during the assembling operations. Pieces for one side of the box are then supplied and nailed to the end and partition pieces. The box parts thus assembled are now partially inverted while the end and partition pieces are still clamped. The side pieces for the second side are then nailed to the parts above recited, and the partially formed box is again partly inverted and a third side is added. The box is now completed, except adding the cover to the same; and the latter is added by hand after the box is packed. The product formed as above is now ejected from the machine.

The invention consists in the novel provision, construction, combination, association, and relative arrangement of parts, members and features, all as hereinafter described, shown in the drawings and finally pointed out in claims.

The present invention consists in certain specific improvements upon and departure from that covered in an application of the applicant for patent for box making machines, filed May 2, 1904, Serial No. 206,071; and the following description, as well as the drawings, disclose the main features of construction and organization disclosed in said prior application, as well as the features of improvement constituting the present invention.

In the drawings:—Figures 1 and 2 are perspective views looking respectively toward the front and rear of a machine embodying the invention; Fig. 3 is a perspective view of a certain elevator member included in the construction shown in Figs. 1 and 2, together with certain of its operative connections; Fig. 4 is a perspective view of mechanism for feeding end and partition pieces; the same being embodied in the showing in Figs. 1 and 2; Fig. 5 is an enlarged fragmentary view, partly in section of a detail of the construction shown in Fig. 4; Fig. 6 is a perspective view, partly in section and partly broken away, of certain clamping mechanism and the operative connections of the same, constituting features shown in Figs. 1 and 2; Fig. 7 is a perspective view of apparatus for feeding the side pieces and operative connections of the same, partly broken away and partly in section; Fig. 8 is a sectional elevation of the elevator mechanism for feeding the end pieces and partition pieces, together with operative connections of the same; Fig. 9 is a similar view taken at right angles to the line of vision of Fig. 8, parts being omitted; Fig. 10 is a detail view on enlarged scale showing devices for gripping the side pieces; Fig. 11 is an enlarged detail view of mechanism for lowering the side pieces into position on the end pieces, the same being partly broken away and sectioned; Fig. 12 is an enlarged detail view of mechanism for partially inverting or turning the partially completed box; the same being partly sectioned; Fig. 13 is a detail perspective view of a feature of the showing in Fig. 12; and Fig. 14 is a perspective view of a box constituting the product of the machine shown in the other figures.

Corresponding parts in all the figures are denoted by the same reference characters.

In the drawings, 1. 1 represent four upright frame pieces supported upon a base 1$^b$ and bent outward at 1$^a$ to afford more space for operative parts.

The machine is actuated by a power shaft 3 mounted in bearings 3$^a$ and provided with a belt pulley 4 to be driven from any suitable source of power, and engaged with the shaft by any suitable clutch B, shown as operated by a lever C rotating in its bearings $c$ a rod $b$ with an arm $d$ engaging the clutch mechanism. The shaft is provided with a suitable band brake D, operated (by devices not shown) to resist motion when the clutch is disengaged. The shaft 3 carries a pinion 5 which engages a gear 6 upon a parallel shaft 7 and rotates the latter at a reduced speed. Through gears 8, 9, the shaft 7 rotates at one-third its own speed a parallel counter shaft 10, mounted in suitable bearings.

Upon the frame are secured devices E, without novelty, for feeding nails to the nailing head 2 which reciprocates on rails 2$^a$ on the standards 1 and is actuated by the shaft 7 through gears 6, and connecting rods 13 provided with turnbuckles 13$^a$ and attached to studs 2$^b$ upon the nailing head.

The end and partition pieces are fed from hoppers or chutes A, in the rear of the machine, a set of three pieces, in this instance, being simultaneously pushed edgewise into the proper relative positions upon an elevating device F which then raises them to position upon yielding nailing bases, where they are clamped in position to receive the proper side pieces fed to position from another source. The base of the elevator consists of a horizontal rectangular frame 33$^a$, whose angles fit, respectively, in ways in the standards 1 and which normally rests upon crossbars between the standards. From this base rise vertical members 33$^b$ which receive upon their plane horizontal upper edges, respectively, the vertical end and partition pieces of each box.

Upon the rear side of the machine is a shelf 29$^a$, Fig. 4, supported upon suitable brackets approximately in the plane of the elevator members, the upper surface of the shelf and the upper edges of the members 33$^b$, when the latter are in normal position, being in substantially the same plane. The shelf supports inclined chutes 29' in which, respectively, are placed the two sets of end pieces and the set of partition pieces, all of which are designated by the numeral 29, all of which stand on edge in planes practically parallel to the elevator members 33$^b$, and all of which are urged toward the lower ends of the chutes by springs 29''. The shelf is further provided with vertical plates 29$^b$ forming stops at the lower ends of the chutes each plate being provided with a suitable way to receive a slide 32 having a spring dog 32$^x$ to engage an end piece and push it edgewise inwardly upon the corresponding elevator member 33$^b$, with which the piece alines when pressed against the plate 29$^b$. In putting the pieces in the hoppers, their edges are, or may be, placed against an alining bar 32$^a$ (Fig. 4), fixed to the standards 1. From each slide 32, a rigid stud 32$^c$ projects through a slot 32$^b$ in the corresponding plate 29$^b$ carrying a roller 32$^y$, and is engaged by the slotted end of a rigid arm 31 fixed to a shaft 31$^a$ mounted in bearings in brackets 31$^b$ on the base 1. The arms are made up of two overlapped pieces connected by relatively fragile pins 100, so that any failure of the parts to feed properly will at most merely break the pins, which are readily replaced. The arms are moved positively back and forth by means of eccentrics 28 upon the shaft 10, eccentric straps 28', rods 30, and a bar 31' connecting all the arms together. Against one lateral face of each elevator member 33$^b$ rests a spring plate 35 which has a curved end 35' to guide the entering end or partition piece, which normally projects above said member, and which is capable of vertical movement in guides 39 upon said member. In guides 38 at the lower side of each spring plate are secured rods 39' which pass downward through guides 38. The spring plates are normally held in their uppermost positions by springs 40 surrounding rods 39' between the guides 38 and bearing at their upper end on stops 38'. Guide plates 34 (Fig. 9) are located above the normal plane of the elevator and alongside the paths of the entering end and partition pieces, and in such position that said pieces enter between the spring plates 35 and these plates 34. Two vertical plates 36$^a$ are located in front and rear of the elevator, respectively, (Figs. 3, 9) and are each provided with vertical slots 77 corresponding to the number of members 33$^b$ and located alongside the same but in each case upon the side opposite the corresponding plate 34. In each slot is a sliding block 76 to which is adjustably secured a pin 76$^a$ whose lower end is guided in an aperture 76'. Each pin bears a stop 79 which is adjustable and which is pressed upward by a spring 78 reacting against the bottom of the slot and thus resisting depression of the block. Each block is provided with a pintle 79$^a$ and upon the pintles of each pair of blocks is supported a heavy nailing base 36 whose wedge-like, laterally projecting head 36' extends over the path of the entering end piece, 29, and is normally pressed against the plate 34 by a spring or springs 101. End and partition pieces having been pushed in between the plates 34 and 35 to rest upon the members 33$^b$ below the overhanging heads of the nailing bases, the elevator is at once raised by means to be described.

The shaft 7 bears a loose clutch-member 15' and a clutch member 15 splined upon the shaft and thrown into and out of engagement with its companion by the end 16 of a lever 16ᵇ centrally pivoted at 16ᵃ and having its opposite end swung back and forth by means of a groove 17' in a cam 17 on the counter shaft.

The clutch member 15' carries a rigid arm 33" which is connected by a link 33' to an ear 33ᵏ on the base of the elevator. Obviously, when the clutch is thrown into engagement by the cam 17, the rotation of the shaft 7 in the proper direction swings the arm 33" and lifts the elevator bodily. As it rises, the end and partition pieces 29 resting upon it press against the lower inclined surfaces of the nailing base heads 36' pushing them aside, the springs 101 yielding to permit the movement, and the next instant the wedge-like margins 35' of the spring plates 35 in like manner push past the heads. When the stops 38' meet the lower portions 37 of the nailing bases 36, the spring plates cease to ascend, while the springs 40 yield and the elevator continues to rise. The elevator has carried the pieces 29 high enough to permit the action, the nailing bases are swung beneath them, respectively, by the action of the springs 101, the members 33ᵇ being cut away at a' to allow the entrance of the wedge-like heads 36' at the moment when the elevator reaches the upper limit of its path. In thus rising, the pieces 29 pass between sets of clamping disks 21 (Figs. 1, 6, 12) revolubly mounted upon the sides of arms 24 and lying nearly in the planes of the elevator members 33ᵇ, respectively. At their opposite ends, the arms 24 are pivotally mounted upon a cylindrical rod 25 supported in bearings 25'.

Upper and lower horizontal rods 26 and 27, respectively, pass through the arms 24. Each rod carries coil springs 26' and stops 27' acting upon and bearing against the arms 24, causing companion disks 21 to tend to approach each other in gripping function. The shaft 25 is keyed in its bearings, as at 25ᵃ, and the hubs 24' of the arms 24 slide upon the shaft 25.

A collar 24" fixed upon the shaft 25 carries a centrally pivoted lever 22ᵃ from the upper end of each a link 22ᵇ extends to a block 22ᶜ upon the rod 26; and from a lower point on the upper end portion of which a link 22ᵈ extends to a block 22ᵉ on the lower rod 27. A connecting rod 23 extends from the lower end of the lever 22ᵃ to a bell crank lever 23ᵇ which is operated by a connecting rod 23ᶜ connected with a centrally pivoted lever 23ᵈ provided with a boss 23ᵉ traversing a heart shaped cam groove 23ᶠ in a cam 23", on shaft 10. Oscillation of the lever 22ᵃ by the cam 23" and immediate parts oppositely moves the rods 26 and 27 endwise, and spreads apart the disks 21. The movements just described are so timed that when the entrance of the nailing bases beneath the several end and partition pieces has given each its proper support, each is instantly clamped and held fixed awaiting the attachment of side pieces. The side pieces are piled in a hopper or chute, in the rear of and above the clamped end and partition pieces, consisting of two U-shaped end guides facing each other (Fig. 7) and each having a vertically adjustable bottom 46 carried by a bar 47 sliding in guides 47' upon the outer faces of the end guides 43. Each bottom 46 is grooved above to receive the free end of an arm 45 which bears two sets of clamps 45' (Fig. 10), each adapted to seize and hold a side piece. The opposite ends of these arms are secured to a transverse rod 55 having its ends connected, respectively, by links 55", to levers 41 pivoted at 41ᵃ to brackets 41' and swung upon their pivots by eccentrics 12 whose straps 12' are pivotally connected to the lower ends of the levers 41. By this means the arms 45 are caused to move back and forth longitudinally. For safety, the upper arm of the lever 41 is made in two parts which are connected by shearing pins 100.

The machine chosen for illustration uses two spaced side pieces for each side of the box, and hence each arm 45 has two pairs of side piece clamps, as shown in Fig. 10. The terminal pair consists of two fingers 56, 57, having opposing offsets or noses 102 in their upper edges and having their inner ends pivoted to the arm 45, one 57, by a pin 57' and the other 56, by a pin 57" received in an elongated slot 58 permitting gripping boards of varying widths. Connected with each of the fingers 56 is a depending link 56ᵃ pivotally connected with the arm 45 as at 56ᶜ. A contractile spring 61 extends from the inner end of each finger 56 to the arm 45; and a bent spring 60 acts upon each of the fingers 57, which latter are each provided with an enlarged opening 60ᵃ within which projects a pin 60ᵇ. The springs 60 and 61 tend to hold the noses 102 above the arm 45 in position to grip a board; and permit depression of the noses during the feed of the boards of the side pieces. For engaging the companion side pieces of the set of two, similar fingers 62, 63 are pivoted at adjacent points at 69, and normally held raised by bent springs 64 and 64ᵃ, respectively. Each of the fingers 62 and 63 has an enlarged opening 62ᵃ which receives a pin 62ᵇ similar in function to the pins 60ᵇ and 57", limiting the movements of the fingers 62 and 63 upon depression of the noses 102 of the same during feed of the side pieces. Side pieces being piled in the chute and the fingers 62, 63 being so far forward that they cannot grasp the lower board of the pile, the arms 45 are moved rearward by the action of the eccentrics 12. As the fingers 62 meet the pile of stock, the rounding of their ends, as shown, causes them to swing downward and slide beneath the lower board until the noses 102 pass the rear edge of the latter, when the spring throws it upward into engagement with that edge. The noses in the companion arm engage the opposite edge in like manner and thus the continued movement of the arms 45 causes the bottom board to be pulled from beneath the pile and to be instantly replaced by the next board above it, since the pile descends through the action of gravity. This second board is engaged in the same manner by the fingers 56, 57 as the arms 45 continue to move rearward, but it is not wholly withdrawn from beneath the pile when the limit of rearward movement is reached. The arms now advance and carry both pieces to the front of the chute until they are in position immediately above the clamped end and partition pieces. During this movement, the second clamped side piece enters again beneath the pile before the first has fully passed therefrom, and as the noses 102 have a depth less than the thickness of the boards, only friction tends to carry the lower unclamped board of the pile onward with the others. This unclamped board is prevented from advancing by spring fingers 75' beneath which one board but not two superposed boards may pass freely. These fingers allow a thick board to pass, should such a board be in the pile. The clamped side pieces after being thus advanced are normally held a little above the clamped end and partition pieces to which they are to be nailed, and to lower them the bottoms 46 which support the arms 45 are lowered, through the action of the descending nailing head which strikes the free ends of levers 44, pivoted at 50, to the guide upon the chute, or to other suitable support. The bars 47 supporting the bottom pieces 46 are provided with bosses 52 resting normally upon sliding latches 53 traversing the lower guides 47'. Flexible connections or chains 54 extend from the latches 53 to the rod 55.

The lever 44 is loosely engaged with a pin 51 upon a sliding bolt 49 mounted adjacent to the upper guide 47'; and entering an opening 49' in a bar 47. The bar 47 carries a lateral buffer 47ª which strikes the upper guide 47' when the bar 47 descends when the arms 45 have moved to the position opposite that shown in Fig. 7, so as to have received two side pieces, the rod 55 pushes the latches 53 from beneath the bosses 52; and the nailing heads descending strike the levers 44 and withdraw the bolts 49 allowing the arms 45 and pieces 46 to descend. The nailing head nails the side pieces fast the instant after they are lowered to place upon the end and partition pieces and then at once rises to normal position. As it rises the arms 45 return to the position shown in Fig. 7, the latches 53 raise the rods 47, and the nailing head throws the levers 44 to shoot the bolts and lock the arms 45 in raised position, or springs 44 may return the bolts 49. As has been seen, each nailing base is supported by springs 78, and these are stiff enough to resist ordinary nailing pressure but they yield when the nailing head meets the wood after the nails are home; and indeed this is indispensable, for stock may vary in thickness and necessarily in nailing on the third side we have beneath it both the pieces to which it is nailed and the side first nailed to the same piece. The nailing head bears spring fingers 84 (Fig. 1) in position to adjust the side pieces accurately in position at the instant preceding the nailing. The first side having now been nailed in place, the structure must be turned 90° to bring the next side to position beneath the nailing head, and this is done by devices best seen in Fig. 12. As has been stated, the clamping disks 21 are revolubly mounted on the arms 24 and the latter are formed into two sets by transverse rods 26 and 27 connecting alternate arms. One disk of each set bears on its lateral face, at quadrantal points, studs 69 provided with antifriction sleeves or rollers 69ª each of which in turn travels along an irregular portion 67 of a plate 103, fixed to the machine frame parallel to the planes of the disks, and is at the same time compelled to advance through an angular path of exactly 90°. To secure this result, the arms 24 are periodically raised and lowered by connecting rods 66 (Fig. 12) whose lower ends are pivotally connected with a centrally pivoted lever whose opposite arms are actuated by cams 11 upon the shaft 7.

The parts being in the positions illustrated in Fig. 12, upward swinging of the arm 24 compels the lower right hand stud to pass obliquely upward toward the left in a groove 68 in the plate 103 and then along the lower side of a projecting finger 70 of the plate, which presses it still farther to the left and beyond the end of the groove. The arm 24 then reverses its direction of movement and presses the stud upon the inclined edge 71 of the plate and forces it still farther to the left until it reaches the offset 72. Meantime, the next stud has descended against the end portion of a latch 73 provided with an offset 74, pivoted to the plate 103, and normally held in position to close the lower end of the groove 78 by a spring 104. This second stud pushes the latch aside while itself urged to the left thereby, and finally reaches the precise position occupied by the receding stud at the beginning of the movement, when the disk will obviously have been rotated precisely 90 degrees. As the arms of each set are all connected and rotate or swing together, all the clamps have been simultaneously rotated to the same extent and the partially formed box has been turned exactly 90°, while rising from and falling back upon the nailing bases, and is now in position to receive a second side or set of side pieces. These are added precisely as before, the box is again turned, and the third and last side is similarly added. At this moment, the cam 23″ acts, releasing the clamping disks and leaving the box free upon the nailing bases. Immediately cams 18 (Fig. 1), on the counter shaft 10 eject the box from the machine, the cams acting through pins 19^b, in the cam grooves 18′, arms 19^a centered on the shaft 7, and arms 19 projecting upward from the same into the space in the rear of the box and having at their upper ends pushers suitably beveled at their ends. Simultaneously with the return of the ejectors to normal position, the elevator raising clutch is disengaged and the elevator descends by gravity, the eccentrics 28 operate to again feed end and partition pieces, as at the outset, and thus the operation goes on rapidly, automatically and indefinitely so long as may be desired.

I do not desire to be understood as limiting myself to the specific provision, construction, combination, association and relative arrangement of parts, members and features, shown and described; but reserve the right to vary the same, in adapting the improvements to varying conditions of use, without departing from the spirit of the invention, or the terms of the following claims.

Having thus described my invention, I claim and desire to secure by Letters Patent:

1. In a machine of the character described, means for feeding spaced transverse box pieces, means for feeding side pieces, means for securing the side pieces upon the transverse box pieces; said means for feeding the side pieces comprising a hopper or chute having vertically movable bottom pieces, latches for said bottom pieces, arms slidable on said bottom pieces, a rod connecting said arms and flexibly connected with said latches, means for moving said rod, and bolts for retaining said bottom pieces in elevated positions; said bolts being withdrawn in the movement of the nailing heads whereby the side pieces are secured to said transverse box pieces.

2. In a machine of the character described, means for feeding spaced transverse box pieces, means for feeding side pieces, means for securing the side pieces upon the transverse box pieces; said means for feeding the side pieces comprising a hopper or chute having vertically movable bottom pieces, latches for said bottom pieces, arms slidable on said bottom pieces, a rod connecting said arms and flexibly connected with said latches, means for moving said rod, and spring controlled bolts for retaining said bottom pieces in elevated positions; said bolts being withdrawn in the movement of the nailing heads whereby the side pieces are secured to said transverse box pieces.

3. In a machine of the character described, means for feeding spaced transverse box pieces, means for feeding side pieces, means for securing the side pieces upon the transverse box pieces; said means for feeding the side pieces comprising a hopper or chute having vertically movable bottom pieces, latches for said bottom pieces, arms slidable on said bottom pieces, a rod connecting said arms and flexibly connected with said latches, means for moving said rod, and bolts for retaining said bottom pieces in elevated positions; said bolts being withdrawn in the movement of the nailing heads whereby the side pieces are secured to transverse box pieces; said latches raising said bottom pieces and arms during return movements of the arms.

4. In a machine of the character described, means for feeding spaced transverse box pieces, means for feeding side pieces, means for securing the side pieces upon the transverse box pieces; said means for feeding the side pieces comprising a hopper or chute having vertically movable bottom pieces, latches for said bottom pieces, arms slidable on said bottom pieces, a rod connecting said arms and flexibly connected with said latches, means for moving said rod, and bolts for retaining said bottom pieces in elevated positions; said bolts being withdrawn in the movement of the nailing heads whereby the side pieces are secured to said transverse box pieces; said arms being provided with pivoted-spring-controlled fingers having noses normally projecting above the arms and arranged to be engaged with the side pieces.

5. In a machine of the character described, means for feeding spaced transverse box pieces, means for feeding side pieces, means for securing the side pieces upon the transverse box pieces; said means for feeding the side pieces comprising a hopper or chute having vertically movable bottom pieces, latches for said bottom pieces, arms slidable on said bottom pieces, a rod connecting said arms and flexibly connected with said latches, means for moving said rod, and bolts for retaining said bottom pieces in elevated positions; said bolts being withdrawn in the movement of the nailing heads whereby the side pieces are secured to said transverse box pieces; said arms being provided with pivoted spring-controlled fingers having noses normally projecting above the arms and arranged to be engaged with the side pieces; there being two sets of fingers for each arm, and one finger of one of said sets being controlled in its movements by a supporting link.

6. In a machine of the character described, a chute or hopper for feeding box side pieces, spaced arms upon which the box side pieces are disposed, means for moving said arms endwise, latches normally maintaining said arms against downward movement, and operative connections whereby said latches are moved in movements of said arms; said latches serving to elevate said arms during endwise movement of the same.

7. In a machine of the character described, means for feeding spaced transverse box pieces, and an elevator for presenting said transverse box pieces in position for receiving box side pieces; said elevator comprising a rectangular frame; said frame having side plates and spring plates adjacent to the edges of the same, and guiding the box pieces upon said edges; said spring plates being supported by rods, said frame having guides receiving said rods, stops on said rods, and springs surrounding said rods and disposed between said stops and certain of said guides.

In testimony whereof, I have signed my name to this specification in the presence of two subscribing witnesses.

GEORGE D. PARKER.

Witnesses:
RAYMOND IVES BLAKESLEE,
FRED A. MANSFIELD.